US012656942B2

(12) United States Patent
Liu et al.

(10) Patent No.: US 12,656,942 B2
(45) Date of Patent: Jun. 16, 2026

(54) MULTIMEDIA INFORMATION PLAYBACK AND APPARATUS, ELECTRONIC DEVICE, AND COMPUTER STORAGE MEDIUM

(71) Applicant: Beijing Bytedance Network Technology Co., Ltd., Beijing (CN)

(72) Inventors: Ji Liu, Beijing (CN); Yu Sun, Beijing (CN); Yinzhu Liu, Beijing (CN); Tao Sun, Beijing (CN); Cuina Jiao, Beijing (CN); Lin Zhou, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 244 days.

(21) Appl. No.: 18/012,767

(22) PCT Filed: Jul. 19, 2021

(86) PCT No.: PCT/CN2021/107146
§ 371 (c)(1),
(2) Date: Dec. 23, 2022

(87) PCT Pub. No.: WO2022/022316
PCT Pub. Date: Feb. 3, 2022

(65) Prior Publication Data
US 2023/0185444 A1 Jun. 15, 2023

(30) Foreign Application Priority Data
Jul. 27, 2020 (CN) .......................... 202010731818.6

(51) Int. Cl.
*G06F 3/0488* (2022.01)
*G06F 3/0484* (2022.01)
(52) U.S. Cl.
CPC .......... *G06F 3/0488* (2013.01); *G06F 3/0484* (2013.01)

(58) Field of Classification Search
CPC .. G06F 3/0488; G06F 3/0484; G06F 3/04883; G06F 3/01; G06F 3/017; G06F 16/4393
See application file for complete search history.

(56) References Cited

U.S. PATENT DOCUMENTS

2014/0177396 A1* 6/2014 Lee ....................... G06F 3/0489
                                                         368/10
2015/0205511 A1* 7/2015 Vinna ................. G06F 3/04817
                                                         715/716
(Continued)

FOREIGN PATENT DOCUMENTS

CN      106201518 A    12/2016
CN      106547461 A    3/2017
(Continued)

OTHER PUBLICATIONS

International Search Report and Written Opinion in PCT/CN2021/107146, mailed Oct. 28, 2021, 6 pages.

*Primary Examiner* — Phuong H Nguyen
(74) *Attorney, Agent, or Firm* — Astute IP Law Group

(57) ABSTRACT

The present disclosure relates to the technical field of video playback, and provides a multimedia information playback method and apparatus, an electronic device, and a computer readable storage medium. The method includes: during a process of an information flow being browsed, in response to that display time of a target information entry in the information flow on a display interface of the information flow reaches a first time threshold, displaying a preset prompt message on an upper layer of the target information entry, so as to prompt a user to input a corresponding gesture; and in response to that a preset gesture operation to the target information entry inputted by the user is detected, playing multimedia information corresponding to the target information entry.

16 Claims, 8 Drawing Sheets

(56)                    References Cited

U.S. PATENT DOCUMENTS

| | | | |
|---|---|---|---|
| 2017/0083213 A1 | 3/2017 | Missig | |
| 2017/0177296 A1* | 6/2017 | Quirino ................. | G06F 3/0482 |
| 2018/0287808 A1* | 10/2018 | Liston ................. | G06F 11/3438 |
| 2019/0200051 A1* | 6/2019 | Paul ................... | H04N 21/4788 |
| 2021/0287439 A1* | 9/2021 | Goodrich ............... | G06T 7/194 |

FOREIGN PATENT DOCUMENTS

| | | | |
|---|---|---|---|
| CN | 107197338 A | 9/2017 |
| CN | 107831995 A | 3/2018 |
| CN | 108121738 A | 6/2018 |
| CN | 111158811 A | 5/2020 |
| CN | 111177610 A | 5/2020 |
| CN | 111432264 A | 7/2020 |

* cited by examiner during a process of an information flow being browsed, in response to that display time of a target information entry in the information flow on a display interface of the information flow reaches a first time threshold, displaying a preset prompt message on an upper layer of the target information entry, so as to prompt a user to input a corresponding gesture   S101 in response to that a preset gesture operation to the target information entry inputted by the user is detected, playing multimedia information corresponding to the target information entry   S102

FIG.1

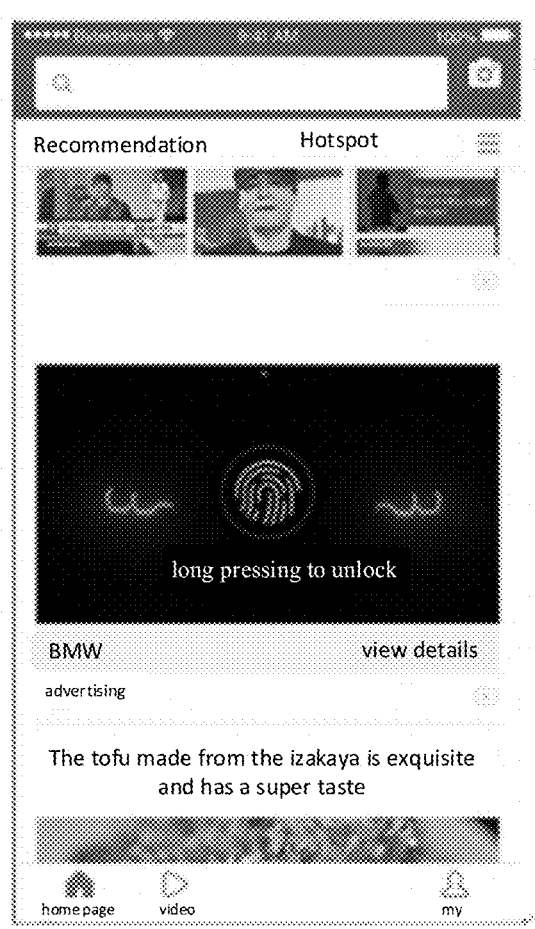

FIG.2(a)

Recommendation        Hotspot

BMW                                view details advertising

The tofu made from the izakaya is exquisite and
has a super taste

MULTIMEDIA INFORMATION PLAYBACK AND APPARATUS, ELECTRONIC DEVICE, AND COMPUTER STORAGE MEDIUM

CROSS REFERENCE TO RELATED APPLICATIONS

The present disclosure is a 35 U.S.C. § 371 National Phase of International Patent Application No. PCT/CN2021/107146 titled "MULTIMEDIA INFORMATION PLAY-BACK AND APPARATUS, ELECTRONIC DEVICE, AND COMPUTER STORAGE MEDIUM", filed on Jul. 19, 2021, which claims priority of Chinese patent application filed on Jul. 27, 2020, with the application No. 202010731818.6, both of which are incorporated herein by reference in their entireties and as part of the present disclosure.

TECHNICAL FIELD

The present disclosure relates to a technical field of video playing, and in particular to a multimedia information play-back method, apparatus, electronic device and computer readable storage medium.

BACKGROUND

With social informationization and emergence of frag-mented information, feed information flow has become the main means for users to acquire information.

SUMMARY

One aspect, providing a multimedia information playback method, and the multimedia information playback method includes:

during a process of an information flow being browsed, in response to that display time of a target information entry in the information flow on a display interface of the information flow reaches a first time threshold, displaying a preset prompt message on an upper layer of the target information entry, so as to prompt a user to input a corresponding gesture; and in response to that a preset gesture operation to the target information entry inputted by the user is detected, playing multimedia information corresponding to the target information entry.

Second aspect, providing a multimedia information play-ing apparatus, and the apparatus includes:

a display module, configured to, during a process of an information flow being browsed, in response to that display time of a target information entry in the infor-mation flow on a display interface of the information flow reaches a first time threshold, displaying a preset prompt message on an upper layer of the target infor-mation entry, so as to prompt a user to input a corre-sponding gesture; and a first playing module, configured to play multimedia information corresponding to the target information entry, in response to that a preset gesture operation to the target information entry inputted by the user is detected.

Third aspect, providing an electronic device, the elec-tronic device includes:

at least one processor;

a memory; and at least one application program, wherein the at least one application program are stored in the memory and configured to be executed by the at least one processor, and the at least one application program are configured to: execute the multimedia information playback method as shown in the first aspect of the present disclosure.

Fourth aspect, providing a computer readable storage medium, the computer readable storage medium is config-ured to store computer instructions, and in a case where the computer instructions are run on a computer, the multimedia information playback method as shown in the first aspect of the present disclosure is achieved by the computer.

BRIEF DESCRIPTION OF THE DRAWINGS

Combined with the accompanying drawings and referring to the following specific embodiments, the above and other features, advantages and aspects of each embodiment of the present disclosure become more obvious. Throughout the drawings, identical or similar drawings indicate identical or similar elements. It should be understood that the drawings are illustrative, and the originals and elements are not necessarily drawn to scale.

FIG. 1 is a schematic flowchart of a multimedia informa-tion playback method provided by embodiments of the present disclosure.

FIG. 2(a)-FIG. 2(i) are reference diagrams illustrating change states of the playing process of a set of multimedia information.

DETAILED DESCRIPTION

Figure 2B:
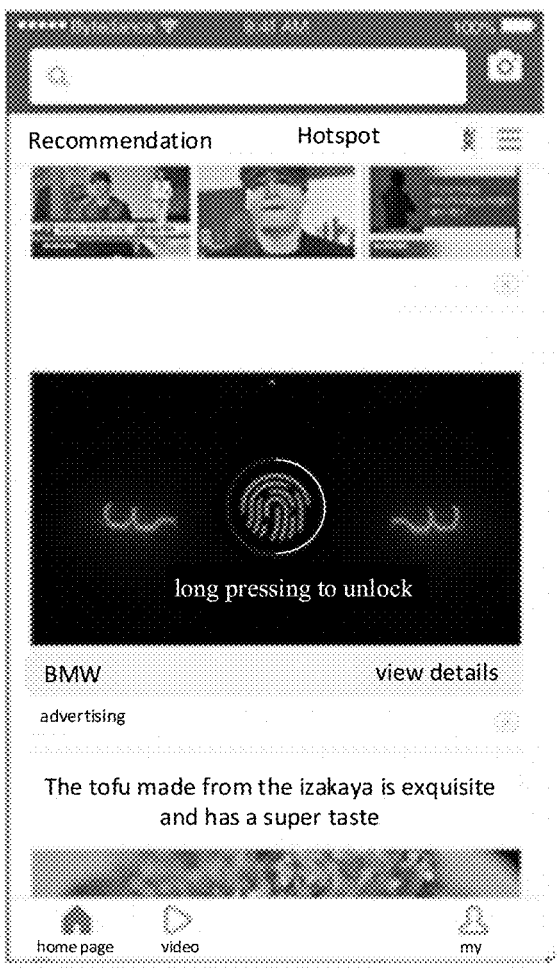

Embodiments of the present disclosure is described in more detail below with reference to the accompanying drawings. Although certain embodiments of the present disclosure are shown in the drawings, it should be under-stood that the present disclosure may be realized in various forms and should not be interpreted as being limited to the embodiments set forth herein, but instead these embodi-ments are provided for a more thorough and complete understanding of the present disclosure. It should be under-stood that the drawings and embodiments of the present disclosure are for exemplary purposes only and are not intended to limit the scope of protection of the present disclosure.

It should be understood that the steps described in the method embodiments of the present disclosure may be performed in different sequences, and/or in parallel. Further, the method embodiment may include additional steps and/or omit to perform the illustrated steps. The scope of this disclosure is not limited in this respect.

The term "including" and its variations as used herein are open-ended to include, i.e. "including but not limited to". The term "based on" is "at least partially based on". The term "one embodiment" means "at least one embodiment"; the term "another embodiment" means "at least one addi-tional embodiment"; and the term "some embodiments" means "at least some embodiments". Relevant definitions of other terms are given in the following description.

It should be noted that the concepts of "first", "second", etc. mentioned in this disclosure are only used to distinguish devices, modules or units, and are not intended to limit the devices, modules or units necessarily different devices, modules or units, nor to limit the order or interdependence of the functions performed by these devices, modules or units.

It should be noted that the modifications of "one" and "plural" mentioned in the present disclosure are schematic rather than restrictive, and those skilled in the art should understand that unless otherwise expressly indicated in the context, it should be understood as "one or more".

The names of messages or information interacted between multiple devices in embodiments of the present disclosure are for illustrative purposes only and are not intended to limit the scope of such messages or information.

In order to make the object, technical solution and advantages of the present disclosure clearer, embodiments of the present disclosure is further described in detail in conjunction with the accompanying drawings.

In general, users can acquire information from feed information flow. However, the existing display means of information entries of information flow is less attractive to users, resulting in reducing the usage experience of users on information flow.

The present disclosure provides a multimedia information playback method, apparatus, electronic device and computer-readable storage medium, which can solve the problem that the information flow is less attractive for users.

The advantages of the technical solution provided by the present disclosure are:

in the present disclosure, during the process of information flow being browsed, in a case where the display time of a target information entry in the information flow on a display interface of the information flow reaches a first time threshold, a preset prompt message is displayed on an upper layer of the target information entry to prompt a user to input corresponding gesture; the user is guided by the target information entry of the information flow to input a preset gesture operation, so as to enhance interaction with the user; and in a case where a preset gesture operation to the target information entry inputted by the user is detected, multimedia information corresponding to the target information entry is played. Therefore, the display means of information entries in the information flow are more diversified to improve the usage experience of users on the information flow.

The multimedia information playback method, apparatus, electronic device and computer-readable storage medium provided by the present disclosure aim to solve the above technical problems in the prior art.

The following is detailed descriptions of technical solutions of the present disclosure and how technical solutions of the present disclosure solve the above technical problems with specific embodiments. The following specific embodiments can be combined with each other, and same or similar concepts or processes may not be repeated in some embodiments. The embodiments of the present disclosure is described below in combination with the drawings.

Embodiments of the present disclosure provide a multimedia information playback method, as shown in FIG. 1, the method includes:

step S101: during a process of an information flow being browsed, in response to that display time of a target information entry in the information flow on a display interface of the information flow reaches a first time threshold, displaying a preset prompt message on an upper layer of the target information entry, so as to prompt a user to input a corresponding gesture.

The information flow may be an information set that can be browsed in terminal devices, and the target information entry in the information flow may be specific information in the information set.

It can be understood that in a case where the display time of the target information entry on the display interface of the information flow reaches the first time threshold, e.g., 5$s$ or 10$s$, the user may be considered to be interested in the content of the target information entry, and at this time, in order to increase interest of user in continuing browsing, the preset prompt message can be displayed on the upper layer of the target information entry to prompt the user to input a corresponding gesture.

The upper layer of the target information entry may have many forms. The upper layer may be above the target information entry, or a layer may be added on a layer for displaying the target information entry, and the preset prompt message is displayed on the new layer.

In one embodiment of the present disclosure, the new layer may be a guide mask; the preset prompt message may be a text message and prompt that the gesture inputted by the user may be any one of long pressing, clicking, double-clicking, dragging or moving; and correspondingly, the preset prompt message in the guide mask may be a text prompt message of long pressing to unlock, a text prompt message of clicking to unlock, a text prompt message of double-clicking to unlock, a text prompt message of dragging to unlock, a text prompt message of moving to unlock, etc.

In one embodiment of the present disclosure, the trigger condition of displaying the preset prompt message on the upper layer of the target information entry may also be other scheduled time or scheduled events.

For example, the preset prompt message may be displayed according to the preset time of the server, and the preset prompt message may also be displayed in a case where a specific screen appears in the browsing process of the information flow.

Step S102: in response to that the preset gesture operation to the target information entry inputted by the user is detected, playing multimedia information corresponding to the target information entry.

The preset gesture operation may be relevant to the preset prompt message. For example, in a case where the preset prompt message is the text prompt message of long pressing to unlock, the preset gesture operation may be long pressing; and the multimedia information may be any one of text, picture, audio, and video relevant to the target information entry.

In one embodiment of the present disclosure, if the preset gesture operation is long pressing, in a case where the screen pressed by the user for a long time is detected, one of text, picture, audio, and video relevant to the target information entry can be played.

In one embodiment of the present disclosure, in a case where the preset gesture operation inputted by the user meets a certain rule, multimedia information corresponding to the target information entry can also be played.

Specifically, in a case where the preset gesture operation is long pressing, a rule met by the preset gesture may be that a fingerprint inputted by the user is successfully matched, and meanwhile, the progress bar is full. In a case where the preset gesture operation is clicking or double-clicking, the rule met by the preset gesture may be that an Easter egg is broken. In a case where the preset gesture operation is dragging or moving, the rule met by the preset gesture may be that a missing figure is consistent with a gap of an original figure.

In one embodiment of the present disclosure, the multimedia information is generated by extracting target feature information of a frame image in the target information entry.

It can be understood that in order to make the target information entry more attractive for the user, the multimedia information corresponding to the target information entry may be generated based on a main frame image, that is target feature information, in the target information entry.

Specifically, taking the case that target entry information includes advertisement entry information as an example, the main frame image of the target entry information may include information such as a product picture. Multimedia information may be generated by capturing the product information in the target information entry by augmented reality (AR) technology.

For example, in a case where an advertisement information entry includes an automobile advertisement information entry, the advertisement information entry generally contains images of a car, a road and a tree, product information in an automobile advertisement, that is feature information of a car image, may be captured by using the AR technology, and then multimedia information corresponding to the car may be generated by using the feature information of car images. Specifically, the main frame image of the automobile advertisement is captured by using the AR technology, various angles and shapes of the car are acquired, and then a plurality of acquired main frame images of the car images are utilized to display the car to users in an all-round way.

Optionally, a commodity climax node in the advertisement information entry may also be identified by utilization of the AR technology. For example, in a case where the advertisement information entry is about to display the product, the multimedia information corresponding to the advertisement information entry is played, so that the multimedia information and the advertisement information entry can achieve visual unity, thereby improving user viewing experience.

In the present disclosure, during the process of information flow being browsed, in a case where the display time of a target information entry in the information flow on a display interface of the information flow reaches a first time threshold, a preset prompt message is displayed on an upper layer of the target information entry to prompt a user to input corresponding gesture; the user is guided by the target information entry of the information flow to input a preset gesture operation, so as to enhance interaction with the user; and in a case where a preset gesture operation to the target information entry inputted by the user is detected, multimedia information corresponding to the target information entry is played. Therefore, the display means of information entries in the information flow are more diversified to improve the usage experience of users on the information flow.

In one embodiment of the present disclosure, the preset gesture operation includes: performing a preset gesture action to the target information entry for a preset duration.

It can be understood that in a case where the preset gesture operation inputted by the user reaching the preset duration is detected, e.g., 3s, multimedia information corresponding to the target information entry can be played.

In one embodiment of the present disclosure, during a process of the user inputting the preset gesture operation, playing a gesture detection progress animation matched with the preset gesture operation.

It can be understood that in order to achieve better interaction with the user and reduce the anxious feeling of the user in waiting, the terminal can play the gesture detection progress animation corresponding to the preset gesture operation in a case where the preset gesture operation inputted by the user is detected.

In one embodiment of the present disclosure, during the process of the user inputting the preset gesture operation, playing the gesture detection progress animation matched with the preset gesture operation includes:

based on an operation type of the preset gesture operation, determining the gesture detection progress animation matched with the operation type.

Specifically, in a case where the preset gesture operation inputted by the user is long pressing, the matched animation may be fingerprint inputting; in a case where the gesture operation is clicking or double-clicking, the matched animation may be smashing golden eggs; and in a case where the gesture operation is dragging or moving, the matched animation may be jigsaw, etc.

In one embodiment of the present disclosure, during the process of the user inputting the preset gesture operation, playing the gesture detection progress animation corresponding to the preset gesture operation further includes:

based on the implementation progress of the preset gesture operation, playing the gesture detection progress animation.

Specifically, in a case where the preset gesture operation inputted by the user is long pressing, a progress animation matched with the long pressing time is displayed by the terminal, such as a time progress bar, movement of a clock animation pointer, a matched percentage number, filled graphics, etc.

The interaction with the user can be more interesting by displaying the gesture detection progress animation corresponding to the preset gesture operation, so as to attract the user to execute the operation, thereby increasing the user's dwell time in the current interface.

In one embodiment of the present disclosure, the step S102 includes:

displaying a playing interface of the multimedia information corresponding to the target information entry on the upper layer of the display interface of the information flow in a superimposition way, and playing the multimedia information in the playing interface.

It can be understood that a new layer may be added on the display interface of the information flow, and the multimedia information is played in the new layer.

In one embodiment of the present disclosure, the multimedia information corresponding to the target information entry may also be played in full-screen.

It can be understood that in a case where the target information entry is an advertisement information entry, in order to enhance the impression of the user on the product displayed in the advertisement information entry, multimedia information corresponding to the target information entry can be played in full-screen, so that the play of the multimedia information in full screen is more eye-catching and can give more prominence to the product logo.

In one embodiment of the present disclosure, the step S102 includes:

displaying a first preset button in the playing interface of the multimedia information; and in response to a trigger operation of the user on the first preset button, displaying a detailed information page of the target information entry.

The first preset button can be a conversion button. In a case where the target information entry is the advertisement information entry, during the process of displaying product information in an all-round way in the multimedia information, specifically, the conversion button is displayed in the playing interface of the multimedia information, and after the conversion button is clicked by the user, the advertisement detailed information page corresponding to the advertisement information entry may be displayed on the playing interface.

It can be understood that in a case where the conversion button is clicked by the user, the server can designate the user from a viewer of the advertisement to a potential user of the advertisement, and subsequently, corresponding advertisement information entry can be delivered to the user on the terminal interface to attract the user to click.

It should be noted that after the conversion button is clicked by the user, taking the advertisement information entry as an example, a plurality of display effects of the product information included in the advertisement information entry can be displayed in the playing interface to increase the attractiveness of the product to users. Taking an automobile advertisement as an example, a car can be displayed separately through drift or straight-line effect after the conversion button, e.g., immediate test drive button, is clicked by the user.

In one embodiment of the present disclosure, the step S102 includes:

displaying a second preset button in the playing interface of the multimedia information; and in response to a trigger operation of the user on the second preset button, stopping playing the multimedia information.

It can be understood that in order to prevent the user from being unaccustomed to the current multimedia information and getting tired of the product in the target information entry, the second preset button, e.g., close button, may also be displayed during the process of the multimedia playing, and the multimedia information may be stopped playing in a case where a trigger operation on the close button inputted by the user is received by the terminal.

In addition, in a case where the multimedia information is automatically finishes playing, the superimposed new layer may also be closed, and then the information flow is displayed.

The present disclosure further provides a change state diagram of the playing process of a set of multimedia information, as shown in FIG. 2.

Specifically, taking the case that the target information entry includes an automobile advertisement information entry and the gesture operation includes long pressing as an example, as shown in FIG. 2(a), in a case where an automobile advertisement is browsed in the information flow beyond the first preset time, e.g., 5s, a fingerprint animation and a text prompt message of long pressing to unlock are displayed in an upper layer, e.g., a guide mask, of the automobile information entry, to prompt the user to press the fingerprint animation for a long time.

In a case where the gesture operation inputted by the user is detected by the terminal, as shown in FIG. 2(b), a matching progress bar matching with a fingerprint image is played in the guide mask by the terminal to display the gesture detection progress, thereby enhancing user interaction through the gesture operation.

Figure 2C:
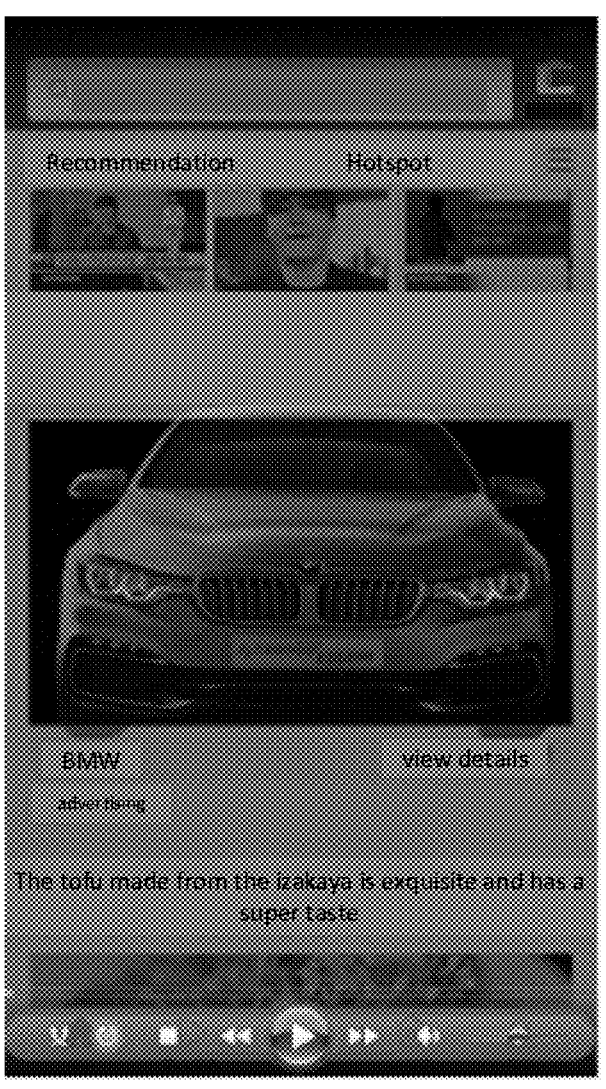
Figure 2D:
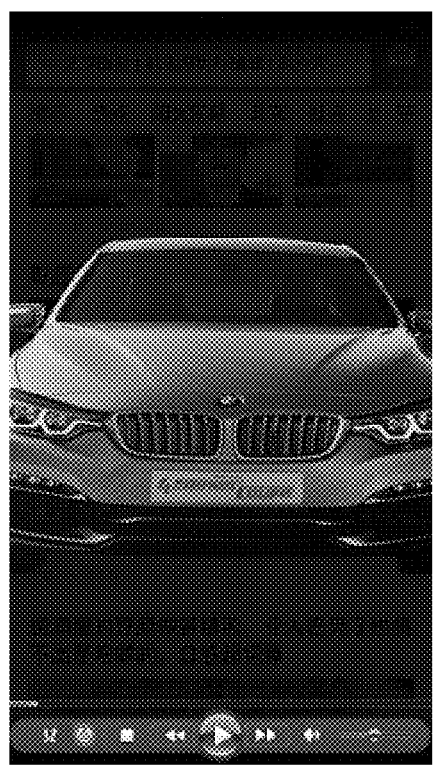

In a case where the terminal recognizes that a fingerprint of the long pressing by the user complies with a fingerprint stored in the terminal or recognizes that the time of long pressing by the user complies with the preset time, as shown in FIG. 2(c) and FIG. 2(d), a special effect animation of the product information corresponding to the automobile advertisement is played, and Specifically, an animation from virtual to real of a car approaching may also be played in full-screen, thereby enhancing the impression of the user. Moreover, the automobile video advertisement and the entrance and exit of the automobile animation achieve visual unity.

Figure 2E:
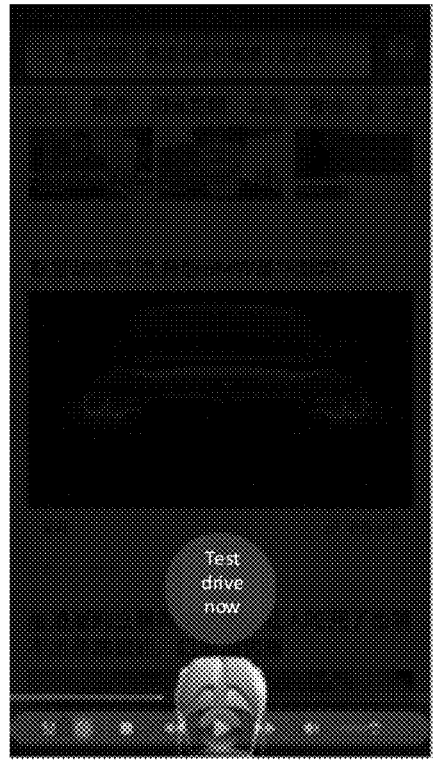

Optionally, a preset button, e.g., an immediate test drive button as shown in FIG. 2(e), may also be displayed in the playing process of the special effect automobile animation.

Figure 2F:
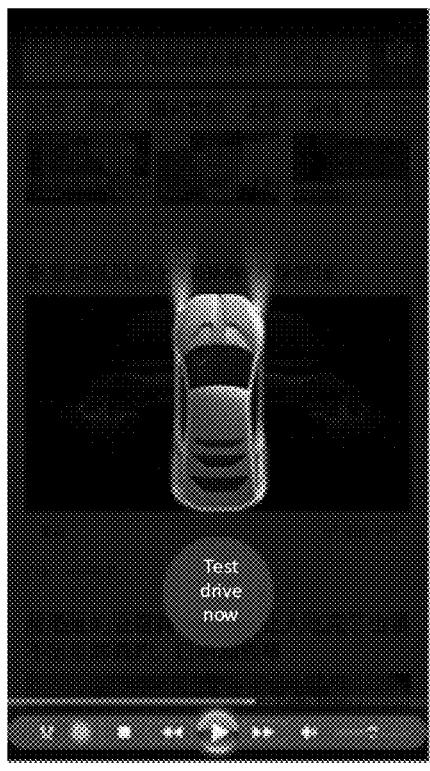
Figure 2G:
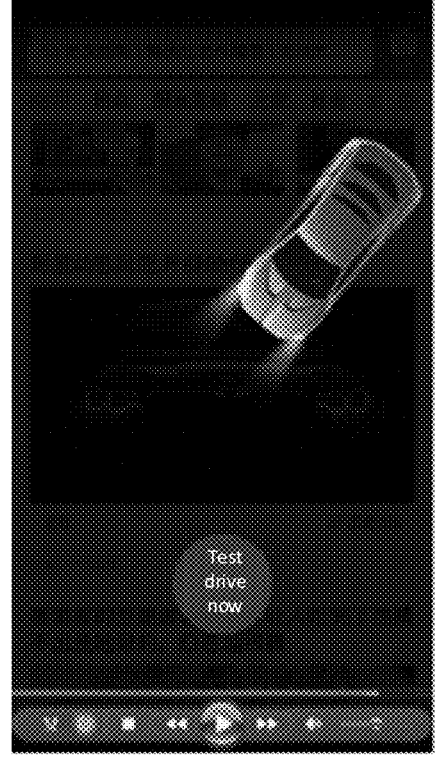
Figure 2H:
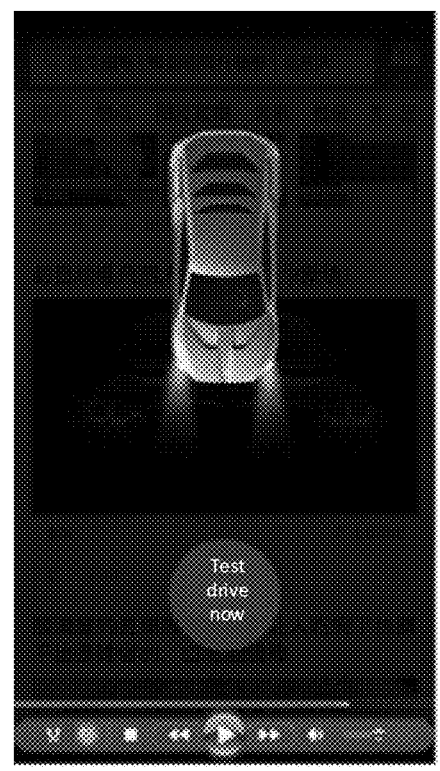

It can be understood that in a case where the immediate test drive button is clicked by the user, the server can designate the current user from a viewer of the advertisement to a potential user of the advertisement and can display more cool effect of the car, thereby improving the viewing experience of the user. FIG. 2(f) and FIG. 2(g) illustrate the car drift effect in a case where the immediate test drive button is clicked by the user. FIG. 2(f) and FIG. 2(h) illustrate the car straight-line effect in a case where the immediate test drive button is clicked by the user.

Figure 2I:
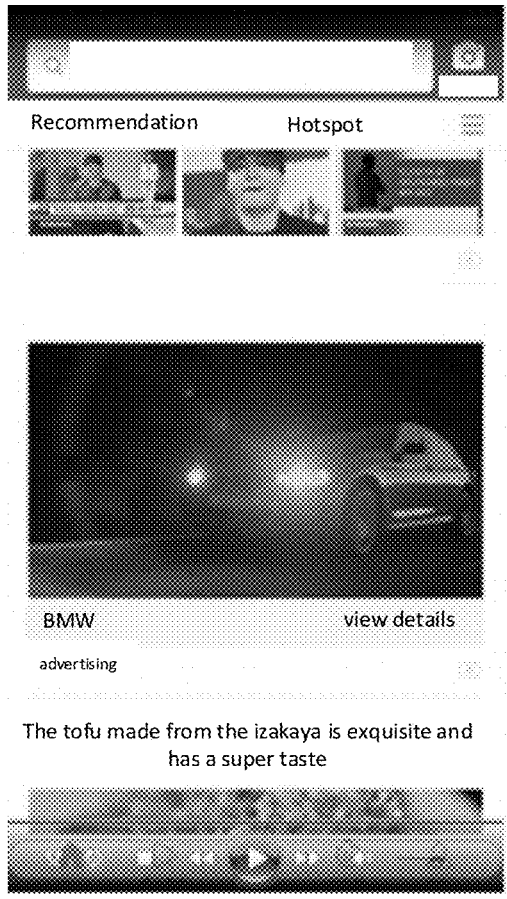

Finally, after the special effect automobile animation is played to the end, as shown in FIG. 2(i), the playing interface of the multimedia information may be closed, and then the automobile advertisement information entry may be played.

It should be noted that the playing process of the multimedia information as shown in FIGS. 2(a)-2(i) is only an example and should not restrict the functions and the scope of use of the embodiments of the present disclosure.

Figure 3:
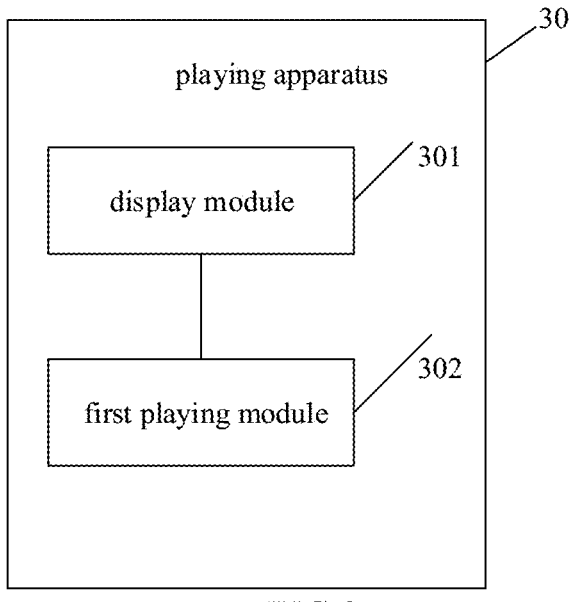
FIG. 3 is a structural schematic diagram of a multimedia information playing apparatus.

The embodiment of the present disclosure provides a multimedia information playing apparatus. As shown in FIG. 3, the playing apparatus 30 may include: a display module 301 and a first playing module 302.

The display module 301 is configured to, during a process of an information flow being browsed, in response to that display time of a target information entry in the information flow on a display interface of the information flow reaches a first time threshold, displaying a preset prompt message on an upper layer of the target information entry, so as to prompt a user to input a corresponding gesture.

The information flow may be an information set that can be browsed in a terminal device, and the target information entry in the information flow may be specific information in the information set.

It can be understood that in a case where the display time of the target information entry on the display interface of the information flow reaches the first time threshold, e.g., 5s or 10s, the user may be considered to be interested in the content of the target information entry, and at this time, in order to increase the user's interest in continuing browsing, the preset prompt message can be displayed on the upper layer of the target information entry to prompt the user to input a corresponding gesture.

The upper layer of the target information entry may have many forms. The upper layer may be above the target information entry, or a layer may be added on a layer for displaying the target information entry and the prompt message is displayed on the new layer.

In one embodiment of the present disclosure, the new layer may be a guide mask;

the preset prompt message may be a text message and prompt that the gesture inputted by the user may be any one of long pressing, clicking, double-clicking, dragging or moving; and correspondingly, the preset prompt message in the guide mask may be a text prompt message of long pressing to unlock, a text prompt message of clicking to unlock, a text prompt message of double-clicking to unlock, a text prompt message of dragging to unlock, a text prompt message of moving to unlock, etc.

In one embodiment of the present disclosure, a trigger condition for displaying the preset prompt message on the upper layer of the target information entry may also be other scheduled time or scheduled events.

For example, the preset prompt message may be displayed according to the preset time of the server, and the preset prompt message can also be displayed in a case where a specific screen appears in the browsing process of the information flow.

The first playing module 302 is configured to play multimedia information corresponding to the target information entry, in response to that a preset gesture operation to the target information entry inputted by the user is detected.

The preset gesture operation may be relevant to the preset prompt message. For example, in a case where the preset prompt message is the text prompt message of long pressing to unlock, the preset gesture operation may be long pressing, and the multimedia information may be any one of text, picture, audio and video relevant to the target information entry.

In one embodiment of the present disclosure, if the preset gesture operation is long pressing, in a case where the screen pressed by the user for a long time, one of text, picture, audio and video relevant to the target information entry may be played.

In one embodiment of the present disclosure, in a case where the preset gesture operation inputted by the user meets a certain rule, the multimedia information corresponding to the target information entry may also be played.

Specifically, in a case where the preset gesture operation is long pressing, the rule met by the preset gesture may be that a fingerprint entered by the user is successfully matched, and meanwhile, and the progress bar is full. In a case where the preset gesture operation is clicking or double-clicking, the rule met by the preset gesture may be that the Easter egg is broken; and in a case where the preset gesture operation is dragging or moving, the rule met by the preset gesture may be that a missing figure is consistent with a gap of an original figure.

In one embodiment of the present disclosure, the multimedia information is generated by extracting target feature information of frame images in the target information entry.

It can be understood that in order to make the target information entry more attractive to the user, the multimedia information corresponding to the target information entry may be generated based on a main frame image, that is target feature information, in the target information entry.

Specifically, taking the case that the target entry information includes advertisement entry information as an example, the main frame image of the target entry information may include information such as a product picture, and the multimedia information may be generated by capturing product information in the target information entry by augmented reality (AR) technology.

For example, in a case where an advertisement information entry includes an automobile advertisement information entry, the advertisement information entry generally contains images of a car, a road and a tree, product information in an automobile advertisement, that is feature information of a car image, may be captured by using the AR technology, and then multimedia information corresponding to the car may be generated by using the feature information of car images. Specifically, the main frame image of the automobile advertisement is captured by using the AR technology, various angles and shapes of the car are acquired, and then a plurality of acquired main frame images of the car images are utilized to display the car to users in an all-round way.

Optionally, a commodity climax node in the advertisement information entry may also be identified by using the AR technology. For example, in a case where the advertisement information entry is about to display the product, the multimedia information of the advertisement information entry is played, so that the multimedia information and the advertisement information entry can achieve visual unity, thereby improving user viewing experience.

in the present disclosure, during the process of information flow being browsed, in a case where the display time of a target information entry in the information flow on a display interface of the information flow reaches a first time threshold, a preset prompt message is displayed on an upper layer of the target information entry to prompt a user to input corresponding gesture; the user is guided by the target information entry of the information flow to input a preset gesture operation, so as to enhance interaction with the user; and in a case where a preset gesture operation to the target information entry inputted by the user is detected, multimedia information corresponding to the target information entry is played. Therefore, the display means of information entries in the information flow are more diversified to improve the usage experience of users on the information flow.

In one embodiment of the present disclosure, the preset gesture operation includes:

performing a preset gesture action to the target information entry for a preset duration.

It should be understood that in a case where the preset gesture operation inputted by the user reaches the preset duration, e.g., 3s, the multimedia information corresponding to the target information entry is played.

In one embodiment of the present disclosure, the multimedia information playing apparatus 30 further includes:

a second playing module configured to play a gesture detection progress animation matched with the preset gesture operation during the process of the user inputting the preset gesture operation.

It can be understood that in order to achieve better interaction with the users and reduce the anxious feeling of the users in waiting, the terminal can play the gesture detection progress animation corresponding to the preset gesture operation in a case where the preset gesture operation inputted by the user is detected.

In one embodiment of the present disclosure, the second playing module includes:

a determination unit configured to determine the gesture detection progress animation matched with the operation type, based on the operation type of the preset gesture operation.

Specifically, in a case where the preset gesture operation inputted by the user is long pressing, the matched animation may be fingerprint inputting; in a case where the gesture operation is clicking or double-clicking, the matched animation may be smashing golden eggs; and in a case where the gesture operation is dragging or moving, the matched animation may be jigsaw, etc.

A first playing unit is configured to play the gesture detection progress animation based on the implementation progress of the preset gesture operation in the process of the user inputting the preset gesture operation.

Specifically, in a case where the preset gesture operation inputted by the user is long pressing, a progress animation matched with the long pressing time, such as a time progress bar, the movement of a clock animation pointer, a matched percentage number, filled graphics, etc., is displayed by the terminal.

The interaction with the user can be more interesting by displaying the gesture detection progress animation corresponding to the preset gesture operation, so as to attract the user to execute the operation, thereby increasing the user's dwell time in the current interface.

In one embodiment of the present disclosure, the first playing module includes:

a second playing unit configured to display a playing interface of the multimedia information corresponding to the target information entry on the upper layer of the display interface of the information flow in a superimposition way and play the multimedia information in the playing interface.

It can be understood that a new layer may be added on the display interface of the information flow, and the multimedia information is played in the new layer.

In one embodiment of the present disclosure, the multimedia information corresponding to the target information entry may also be played in full-screen.

It can be understood that in a case where the target information entry is an advertisement information entry, in order to enhance the impression of the user on a product displayed in the advertisement information entry, multimedia information corresponding to the target information entry may be played in full-screen, so that the play of the multimedia information in full screen is more eye-catching and can give more prominence to the product logo.

In one embodiment of the present disclosure, the first playing module includes:

a first display unit configured to display a first preset button in the playing interface of the multimedia information and display a detailed information page of the target information entry in response to a trigger operation of the user on the first preset button.

The first preset button may be a conversion button. In a case where the target information entry is an advertisement information entry, in the process of displaying product information in an all-round way in the multimedia information, specifically, the conversion button is displayed in the playing interface of the multimedia information, and after the conversion button is clicked by the user, an advertisement detailed information page corresponding to the advertisement information entry may be displayed on the playing interface.

It can be understood that in a case where the conversion button is clicked by the user, the server can designate the user from a viewer of the advertisement to a potential user of the advertisement, and subsequently, corresponding advertisement information entry can be delivered to the user on the terminal interface to attract the user to click.

It should be noted that after the conversion button is clicked by the user, taking the advertisement information entry as an example, a plurality of display effects of the product information included in the advertisement information entry can be displayed in the playing interface to increase the attractiveness of the product to users. Taking an automobile advertisement as an example, a car can be displayed separately through drift or straight-line effect after the conversion button, e.g., immediate test drive button, is clicked by the user.

In one embodiment of the present disclosure, the first playing module includes:

a second display unit configured to display a second preset button in the playing interface of the multimedia information and stop playing the multimedia information in response to a trigger operation of the user on the second preset button.

It can be understood that in order to prevent the user from being unaccustomed to the current multimedia information and getting tired of the product in the target information entry, the second preset button, e.g., a close button, may also be displayed during the process of the multimedia playing, and the multimedia information may be stopped playing, in a case where a trigger operation on the close button inputted by the user is received by the terminal.

In addition, the multimedia information playing apparatus further includes:

a close module configured to close the playing interface superimposed on the upper layer of the display interface in a case where the multimedia information finishes playing.

That is, the superimposed new layer can be turned off in a case where the multimedia information is automatically played to the end, and then the information flow can be displayed.

Figure 4:
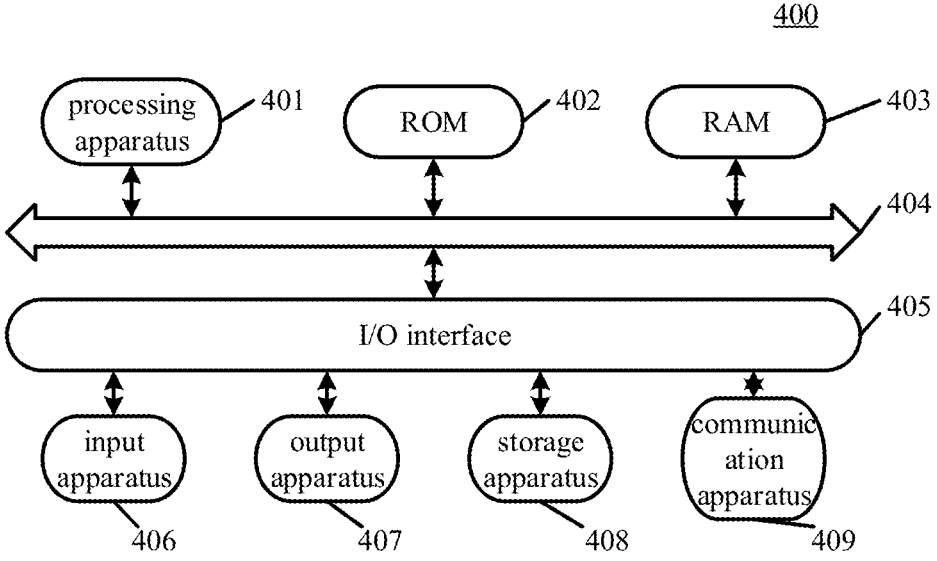
FIG. 4 is a structural schematic diagram of an electronic device for multimedia information playing.

Referring below to FIG. 4, which shows a schematic structural diagram of an electronic device 400 suitable for implementing embodiments of the present disclosure. The electronic device provided by the embodiment of the present disclosure may include but not limited to mobile terminals such as mobile phones, laptops, digital radio receivers, personal digital assistants (PDAs), portable android devices (PADs), portable multimedia players (PMPs) and car terminals (e.g., car navigation terminals), and fixed terminals such as digital TVs and desktop computers. The electronic device as shown in FIG. 4 is only an example and should not restrict the functions and the scope of use of the embodiments of the present disclosure.

The electronic device includes: a memory and a processor, and the processor herein may be a processing apparatus 401 described below, and the memory may include at least one of a read-only memory (ROM) 402, a random access memory (RAM) 403 and a storage unit 408, with the details as follows.

As shown in FIG. 4, the electronic device 400 may include a processing apparatus (e.g., a central processing unit (CPU), a graphics processing unit (GPU)) 401 and can execute various appropriate actions and processing according to programs stored in the ROM 402 or programs loaded to the RAM 403 from the storage unit 408. A plurality of programs and data required for the operation of the electronic device 400 are also stored in the RAM 403. The processing apparatus 401, the ROM 402 and the RAM 403 are connected with each other through a bus 404. An input/output (I/O) interface 405 is also connected to the bus 404.

In general, the following apparatus may be connected to the I/O interface 405: input apparatus 406 including a touch screen, a touch pad, a keyboard, a mouse, a camera, a microphone, an accelerometer, a gyroscope and the like; output apparatus 407 including a liquid crystal display (LCD), a loudspeaker, a vibrator and the like; storage apparatus 408 including magnetic tapes and hard disks; and a communication apparatus 409. The communication apparatus 409 may allow the electronic device 400 to communicate wirelessly or wired with other devices to exchange data. Although FIG. 4 shows the electronic device 400 having various apparatus, it should be understood that not all the shown apparatus are required to be implemented or included. More or less apparatus can be implemented alternatively or included.

Particularly, according to the embodiments of the present disclosure, the processes described above with reference to the flowcharts can be implemented as computer software programs. For instance, the embodiment of the present disclosure provides a computer program product, which includes computer programs hosted on a non-transient computer readable medium. The computer programs include program codes for executing the method as shown in the flowchart. In the embodiment, the computer programs can be unloaded and installed from the internet through the communication apparatus 409, or installed from the storage apparatus 408, or installed from the ROM 402. The above functions defined in the method provided by the embodiment of the present disclosure are executed when the computer programs are executed by the processing unit 401.

It should be noted that the above computer readable medium of the present disclosure may be a computer readable signal medium, a computer readable storage medium, or any combination of the above. The computer readable storage medium, for instance, may be, but not limited to, electrical, magnetic, optical, electromagnetic, infrared, or semiconductor system, device, or equipment, or a combination of the above. A more specific example of the computer readable storage medium may include but not limited to: electrical connection having one or more wires, portable computer disk, hard disk, RAM, ROM, erasable programmable read-only memory (EPROM), flash memory, optical fiber, portable compact disk read-only memory (CD-ROM), optical storage unit, magnetic storage unit, or any suitable combination of the above. In the present disclosure, the computer readable storage medium can be any tangible medium containing or storing programs. The programs may be used by a command execution system, device or apparatus or used in combination with the command execution system, device or apparatus. However, in the present disclosure, the computer readable signal medium may include data signals propagated in baseband or as part of carrier, and computer readable program codes are hosted. The propagated data signals may adopt multiple forms, including but not limited to electromagnetic signals, optical signals or any suitable combination of the above. The computer readable signal medium may also be any computer readable medium except the computer readable storage medium. The computer readable signal medium can send, propagate or transmit programs used by the command execution system, device or unit or used in combination with the command execution system, device or unit. The program codes contained in the computer readable medium can be transmitted by any appropriate medium, including but not limited to: wire, optical cable, radio frequency (RF) and the like, or any suitable combination of the above.

In some embodiments, the client and the server can communicate by using any network protocol which is currently known or developed in the future such as hypertext transfer protocol (HTTP) and can be interconnected with digital data communication (e.g., communication network) in any form or medium. The example of the communication network includes local area network (LAN), wide area network (WAN), internet, end-to-end network (e.g., ad hoc end-to-end network), and any currently known or future-developed network.

The above computer readable medium may be included in the above electronic device and may also exist alone and not be assembled into the electronic device.

The above computer readable medium hosts at least one program. When the above at least one program are executed by the electronic device, the electronic device:

display the preset prompt message on the upper layer of the target information entry to prompt the user to input corresponding gesture in a case where the display time of the target information entry in the information flow on the display interface of the information flow reaches the first time threshold in the process of the information flow being browsed; and play the multimedia information corresponding to the target information entry in a case where detecting that the preset gesture operation corresponding to the target information entry is inputted by the user.

Computer program codes for performing the operations of the present disclosure can be written in at least one programming language or a combination thereof. The above programming languages include but not limited to object-oriented programming languages such as Java, Smalltalk and C++, and also include conventional procedural programming languages such as "C" language or similar programming languages. The program codes can be completely executed on a user computer, partially executed on the user computer, executed as a separate package, partially executed on the user computer and partially executed on a remote computer, or completely executed on the remote computer or the server. In the case when the remote computer is involved, the remote computer can be connected to the user computer through any kind of network including LAN or WAN, or can be connected to an external computer (for instance, connected via the Internet by utilization of Internet service providers).

The flowcharts and the block diagrams in the drawings show possible architectures, functions and operations of the system, the method and the computer program product according to the embodiments of the present disclosure. In this regard, each block in the flowchart or the block diagram can represent a module, a program segment, or a part of code. The module, the program segment, or the part of the code includes at least one executable instruction for implementing specified logic functions. It should be also noted that in some alternative implementations, the functions marked in the blocks can also occur in a different order from those marked in the drawings. For instance, two consecutive blocks may actually be executed basically in parallel, and sometimes, may also be executed in a reverse order, determined by involved functions. It should be also noted that each block in the block diagram and/or the flowchart and the combination of the blocks in the block diagram and/or the flowchart can be implemented by a dedicated hardware-based system that performs a specified function or operation, and can also be implemented by the combination of a special hardware and computer instructions.

Modules or units involved in the embodiments of the present disclosure can be implemented by software and can also be implemented by hardware. The name of the module or the unit should not define the unit itself under certain circumstances.

The functions described above in this document can be at least partially executed by at least one hardware logical unit. For instance, without limitation, demonstration type hardware logical units that can be used include: field programmable gate array (FPGA), application-specific integrated circuit (ASIC), application specific standard parts (ASSP), system on a chip (SOC), complex programmable logic device (CPLD).

In the context of the present disclosure, the machine readable medium can be a tangible medium and may include or store programs used by command execution system, apparatus or device or used in combination with the command execution system, apparatus or device. The machine readable medium can be a machine readable signal medium or a machine readable storage medium. The machine readable medium may include but not limited to electronic, magnetic, optical, electromagnetic, infrared, or semiconductor system, device or equipment, or any suitable combination of the above. A more specific example of the machine readable storage medium may include electrical connection based on at least one wire, portable computer disk, hard disk, RAM, ROM, EPROM, flash memory, optical fiber, CD-ROM, optical storage unit, magnetic storage unit, or any suitable combination of the above.

At least one embodiment according to the present disclosure provide a multimedia information playback method, including:

during a process of an information flow being browsed, in response to that display time of a target information entry in the information flow on a display interface of the information flow reaches a first time threshold, displaying a preset prompt message on an upper layer of the target information entry, so as to prompt a user to input a corresponding gesture; and in response to that a preset gesture operation to the target information entry inputted by the user is detected, playing multimedia information corresponding to the target information entry.

In one embodiment of the present disclosure, the preset gesture operation includes:

performing a preset gesture action to the target information entry for a preset duration.

In one embodiment of the present disclosure, multimedia information playback method further includes:

during a process of the user inputting the preset gesture operation, playing a gesture detection progress animation matched with the preset gesture operation.

In one embodiment of the present disclosure, during the process of the user inputting the preset gesture operation, playing the gesture detection progress animation matched with the preset gesture operation includes:

based on an operation type of the preset gesture operation, determining the gesture detection progress animation matched with the operation type; and during the process of the user inputting the preset gesture operation, playing the gesture detection progress animation based on implementation progress of the preset gesture operation.

In one embodiment of the present disclosure, playing the multimedia information corresponding to the target information entry includes:

displaying a playing interface of the multimedia information corresponding to the target information entry on an upper layer of the display interface of the information flow in a superimposition way, and playing the multimedia information in the playing interface.

In one embodiment of the present disclosure, playing the multimedia information corresponding to the target information entry includes:

displaying a first preset button in the playing interface of the multimedia information; and in response to a trigger operation of the user on the first preset button, displaying a detailed information page of the target information entry.

In one embodiment of the present disclosure, playing the multimedia information corresponding to the target information entry includes:

displaying a second preset button in the playing interface of the multimedia information; and in response to a trigger operation of the user on the second preset button, stopping playing the multimedia information.

In one embodiment of the present disclosure, the multimedia information is generated by extracting target feature information of a frame image in the target information entry.

In one embodiment of the present disclosure, the multimedia information playback method further includes:

in a case where the multimedia information is completely played, closing the playing interface superimposed on the upper layer of the display interface.

At least one embodiment according to the present disclosure provide a multimedia information playing apparatus, including:

a display module, configured to, during a process of an information flow being browsed, in response to that display time of a target information entry in the information flow on a display interface of the information flow reaches a first time threshold, displaying a preset prompt message on an upper layer of the target information entry, so as to prompt a user to input a corresponding gesture; and a first playing module, configured to play multimedia information corresponding to the target information entry, in response to that a preset gesture operation to the target information entry inputted by the user is detected.

In one embodiment of the present disclosure, the preset gesture operation apparatus includes:

performing a preset gesture action to the target information entry for a preset duration.

In one embodiment of the present disclosure, the multimedia information playing apparatus further includes:

a second playing module configured to play a gesture detection progress animation matched with the preset gesture operation during the process of the user inputting the preset gesture operation.

In one embodiment of the present disclosure, the second playing module includes:

a determination unit configured to determine the gesture detection progress animation matched with the operation type, based on the operation type of the preset gesture operation; and a first playing unit is configured to play the gesture detection progress animation based on the implementation progress of the preset gesture operation in the process of the user inputting the preset gesture operation.

In one embodiment of the present disclosure, the first playing module includes:

a second playing unit configured to display a playing interface of the multimedia information corresponding to the target information entry on the upper layer of the display interface of the information flow in a superimposition way and play the multimedia information in the playing interface.

In one embodiment of the present disclosure, the first playing module includes:

a first display unit configured to display a first preset button in the playing interface of the multimedia information and display a detailed information page of the target information entry in response to a trigger operation of the user on the first preset button.

In one embodiment of the present disclosure, the first playing module includes:

a second display unit configured to display a second preset button in the playing interface of the multimedia information and stop playing the multimedia information in response to a trigger operation of the user on the second preset button.

In one embodiment of the present disclosure, the multimedia information is generated by extracting target feature information of a frame image in the target information entry.

In one embodiment of the present disclosure, the multimedia information playing apparatus further includes:

a close module configured to close the playing interface superimposed on the upper layer of the display interface in a case where the multimedia information is completely played playing.

At least one embodiment of the present disclosure provide an electronic device for playing multimedia information, which includes at least one processor;

a memory; and at least one application program, the at least one application program are stored in the memory and configured to be executed by at least one processor, and the at least one application program are configured to execute the above multimedia information playback method.

At least one embodiment of the present disclosure provide a computer readable storage medium for playing multimedia information. The computer readable storage medium is used for storing computer instructions, and in a case where computer instructions is run on a computer, the computer can execute the above multimedia information playback method.

The above description is only the preferred embodiment of the present disclosure and the explanation of the applied technical principle. It should be understood by those skilled in the art that the disclosure scope involved in this disclosure is not limited to the technical scheme formed by the specific combination of the above technical features, but also covers other technical schemes formed by any combination of the above technical features or their equivalent features without departing from the above disclosed concept. For example, the technical solution formed by replacing the above features with (but not limited to) technical features with similar functions disclosed in this disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments can also be implemented in a single embodiment in combination. On the contrary, various features described in the context of a single embodiment can also be implemented in multiple embodiments alone or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only example forms of realizing the claims.

What is claimed is:

1. A multimedia information playback method, comprising:

during a process of an information flow being browsed, in response to that display time of a first information entry in the information flow on a display interface of the information flow reaches a first time threshold, displaying a preset prompt message on an upper layer of the first information entry, so as to prompt a user to input a corresponding gesture; and in response to detecting that a duration of a preset gesture operation to the first information entry inputted by the user reaches a preset duration, playing multimedia information corresponding to the first information entry, wherein playing the multimedia information corresponding to the first information entry comprises:

displaying a first preset button in a playing interface of the multimedia information; and in response to a trigger operation of the user on the first preset button, displaying a detailed information page of the first information entry, wherein the detailed information page of the first information entry comprises a plurality of display effects of product information.

2. The method according to claim 1, wherein playing the multimedia information corresponding to the first information entry further comprises:

displaying the playing interface of the multimedia information corresponding to the first information entry on an upper layer of the display interface of the information flow in a superimposition way, and playing the multimedia information in the playing interface.

3. The method according to claim 2, further comprising:

in a case where the multimedia information is completely played, closing the playing interface superimposed on the upper layer of the display interface.

4. The method according to claim 1, wherein playing the multimedia information corresponding to the first information entry further comprises:

displaying a second preset button in the playing interface of the multimedia information; and in response to a trigger operation of the user on the second preset button, stopping playing the multimedia information.

5. The method according to claim 1, wherein the multimedia information is generated by extracting first feature information of a frame image in the first information entry.

6. The method according to claim 1, further comprising:

during a process of the user inputting the preset gesture operation, playing a gesture detection progress animation matched with the preset gesture operation.

7. The method according to claim 6, wherein during the process of the user inputting the preset gesture operation, playing the gesture detection progress animation matched with the preset gesture operation, comprises:

based on an operation type of the preset gesture operation, determining the gesture detection progress animation matched with the operation type; and during the process of the user inputting the preset gesture operation, playing the gesture detection progress animation based on implementation progress of the preset gesture operation.

8. The method according to claim 6, wherein playing the multimedia information corresponding to the first information entry further comprises:

displaying the playing interface of the multimedia information corresponding to the first information entry on an upper layer of the display interface of the information flow in a superimposition way, and playing the multimedia information in the playing interface.

9. The method according to claim 6, wherein playing the multimedia information corresponding to the first information entry further comprises:

displaying a second preset button in the playing interface of the multimedia information; and in response to a trigger operation of the user on the second preset button, stopping playing the multimedia information.

10. The method according to claim 6, wherein the multimedia information is generated by extracting first feature information of a frame image in the first information entry.

11. An electronic device, comprising:

at least one processor; a memory; and at least one application program, wherein the at least one application program is stored in the memory and configured to be executed by the at least one processor, and the at least one application program is configured to execute a multimedia information playback method, which comprises:

during a process of an information flow being browsed, in response to that display time of a first information entry in the information flow on a display interface of the information flow reaches a first time threshold, displaying a preset prompt message on an upper layer of the first information entry, so as to prompt a user to input a corresponding gesture; and in response to detecting that a duration of a preset gesture operation to the first information entry inputted by the user reaches a preset duration, playing multimedia information corresponding to the first information entry, wherein playing the multimedia information corresponding to the first information entry comprises:

displaying a first preset button in a playing interface of the multimedia information; and in response to a trigger operation of the user on the first preset button, displaying a detailed information page of the first information entry, wherein the detailed information page of the first information entry comprises a plurality of display effects of product information.

12. The electronic device according to claim 11, wherein playing the multimedia information corresponding to the first information entry further comprises:

displaying the playing interface of the multimedia information corresponding to the first information entry on an upper layer of the display interface of the information flow in a superimposition way, and playing the multimedia information in the playing interface.

13. The electronic device according to claim 12, wherein the method further comprises:

in a case where the multimedia information is completely played, closing the playing interface superimposed on the upper layer of the display interface.

14. The electronic device according to claim 11, wherein playing the multimedia information corresponding to the first information entry further comprises:

displaying a second preset button in the playing interface of the multimedia information; and in response to a trigger operation of the user on the second preset button, stopping playing the multimedia information.

15. The electronic device according to claim 11, wherein the multimedia information is generated by extracting first feature information of a frame image in the first information entry.

16. A computer-readable storage medium, wherein the computer-readable storage medium is configured to store computer instructions, and in a case where the computer instructions are run on a computer, the computer executes a multimedia information playback method, which comprises:

during a process of an information flow being browsed, in response to that display time of a first information entry in the information flow on a display interface of the information flow reaches a first time threshold, displaying a preset prompt message on an upper layer of the first information entry, so as to prompt a user to input a corresponding gesture; and in response to detecting that a duration of a preset gesture operation to the first information entry inputted by the user reaches a preset duration, playing multimedia information corresponding to the first information entry, wherein playing the multimedia information corresponding to the first information entry comprises:

displaying a first preset button in a playing interface of the multimedia information; and in response to a trigger operation of the user on the first preset button, displaying a detailed information page of the first information entry, wherein the detailed information page of the first information entry comprises a plurality of display effects of product information.

* * * * *